United States Patent
Bunger

[11] 3,841,268
[45] Oct. 15, 1974

[54] LIVESTOCK WATERING TROUGH

[76] Inventor: Richard E. Bunger, 5202 E. Washington St., Phoenix, Ariz. 85034

[22] Filed: Apr. 16, 1973

[21] Appl. No.: 351,281

[52] U.S. Cl............................ 119/73, 119/61, 119/78
[51] Int. Cl................................................. A01k 7/00
[58] Field of Search........... 119/78, 73, 72, 72.5, 61

[56] References Cited
UNITED STATES PATENTS

| | | | |
|---|---|---|---|
| 1,877,084 | 9/1932 | Tolley | 119/73 |
| 2,570,694 | 10/1951 | Langenbahn | 119/78 |
| 2,629,040 | 2/1953 | Smith | 119/73 |
| 3,745,977 | 7/1973 | Martin | 119/78 X |
| 2,452,237 | 10/1948 | Hoburg et al. | 119/72 |

Primary Examiner—Robert Peshock
Assistant Examiner—J. N. Eskovitz
Attorney, Agent, or Firm—Warren F. B. Lindsley

[57] ABSTRACT

A rectangular fiberglass watering trough mountable on a platform or pedestal and defining a water holding cavity, the underside of which is covered with insulating material which substantially fills the air space between the bottom well of the cavity and the side walls of the trough in a substantially airtight arrangement when mounted on a platform.

16 Claims, 4 Drawing Figures

PATENTED OCT 15 1974  3,841,268
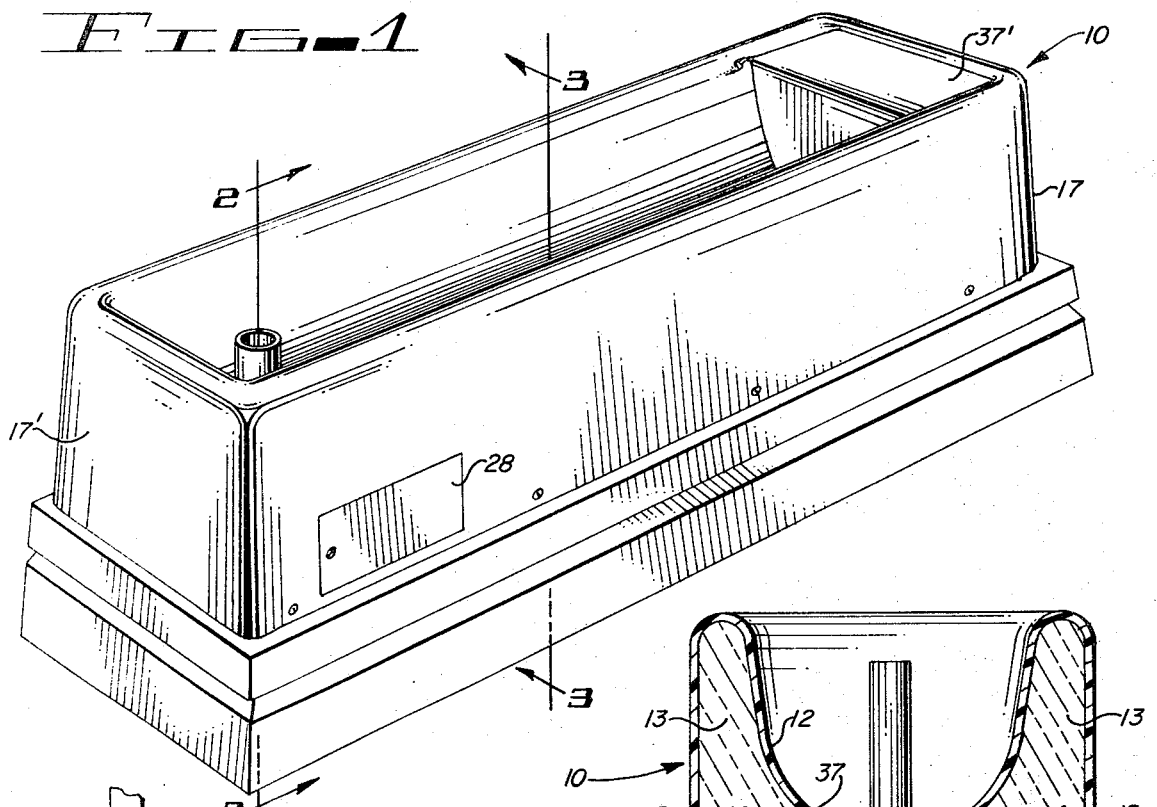
FIG-1
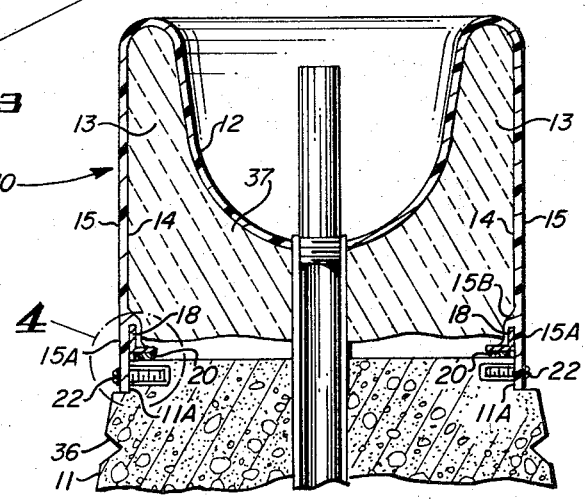
FIG-2
FIG-4
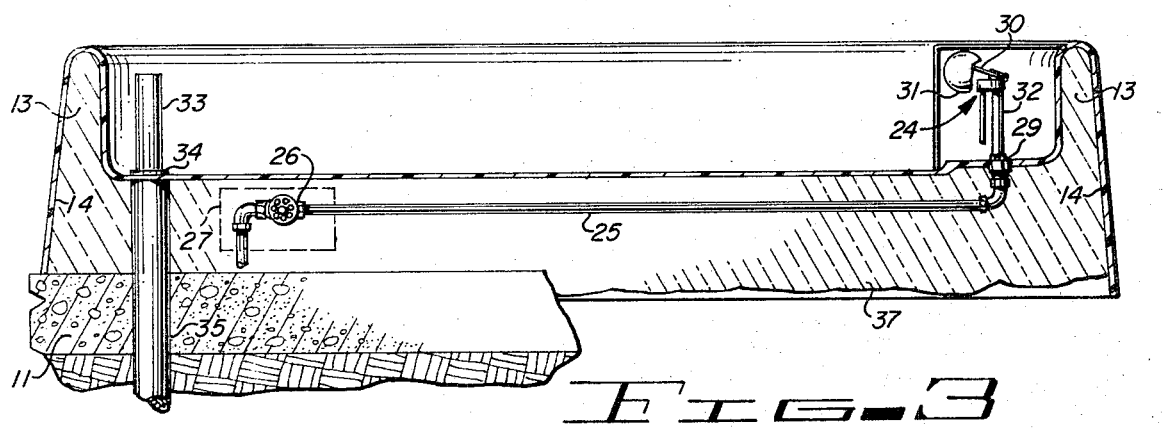
FIG-3

LIVESTOCK WATERING TROUGH

BACKGROUND OF THE INVENTION

This invention is directed to livestock watering apparatus and more particularly to precast or molded plastic or fiberglass troughs which are insulated below the watering cavity to aid in keeping the trough contents from freezing in cold weather and to substantially eliminate condensation from the underside of the cavity.

FIELD OF THE INVENTION

This invention eliminates the need for heaters for livestock watering troughs since the novel characteristics of the trough together with its insulated and concealed plumbing extending along the trough below its watering cavity aid in retaining the heat of the slow-moving stream of water constantly flowing through the trough.

DESCRIPTION OF THE PRIOR ART

Prior art devices have relied on heaters and water movement through a drinking trough to keep the water from freezing; however, this method has not been effective in extremely cold weather. Therefore, a need exists for a better watering trough which may be easily cleaned and which functions effectively in cold weather to keep water from freezing as well as its associated plumbing fixtures and can be inexpensively manufactured on a production line basis.

SUMMARY OF THE INVENTION

In accordance with the invention claimed, a new and improved livestock watering trough is provided which is precast or molded of plastic or fiberglass and insulated below its feeding cavity in an improved manner to keep its contents and plumbing fixtures from freezing in cold weather.

It is, therefore, one object of this invention to provide a new and improved livestock watering trough.

Another object of this invention is to provide a new and improved precast or molded plastic or fiberglass watering trough which is insulated below its watering cavity to preserve the heat of its contents and to effectively eliminate condensation below the cavity with the resulting water saturated trough supporting soil.

A further object of this invention is to provide a new and improved watering trough for livestock wherein its plumbing is encased in insulation along with the bottom surface of its cavity to preserve the natural heat of the water, to substantially eliminate condensation and to fill the space that varmints like to occupy.

A still further object of this invention is to provide an improved structurally strong and rigid watering trough which is insulated along the bottom of the watering cavity with foam type insulation of an unbroken continuity.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing, in which:

FIG. 1 is a front perspective view of a livestock watering trough incorporating the features of this invention;

FIG. 2 is a cross-sectional view of FIG. 1 taken along the line 2—2;

FIG. 3 is a cross-sectional view of FIG. 1 taken along the line 3—3; and

FIG. 4 is a partial broken away cross-sectional view showing how the trough of FIG. 1 fits onto its supporting slab together with the interlocking of it to a concrete apron or slab.

DESCRIPTION OF THE PREFERRED EMBODIMENT

Referring more particularly to the drawing by characters of reference, FIG. 1 discloses a livestock watering trough 10 fitted or seated on a concrete platform 11. It should be noted that the terminology livestock watering trough is intended to cover the usage of this trough for any feeding and watering purpose for animals of any type such as, for example, swine, cattle, horses, sheep and the like.

The trough may be precast to any form defining a concave surface 12 which will hold water and may be sloped to one corner, if so desired. As shown more clearly in FIG. 2, the outer surface of the trough may be formed from a precast or molded plastic or fiberglass of one piece which defines pockets 13 underneath the concave surface 12 and between it and the substantially vertically positioned inside walls 14 of the legs 15 of the trough.

As shown in FIGS. 2 and 4, the ends of legs 15 of the trough are bifurcated with portions 15A extending beyond the portions 15B. Although the cross-sectional views shown are taken along the length of the trough, it should be recognized, as shown in FIG. 1, that the sides of the trough forming its legs 15 and cavity 12 extend around its ends 17, 17' to form a continous uninterrupted surface with rounded corners to eliminate pockets which collect dirt and unused food products.

FIGS. 2 and 4 further illustrate the use of a right angular flange 18 having its leg 18A extending into the space formed between the bifurcated legs 15A, 15B and with its legs 18B extending substantially parallel with the longitudinal axis of the trough.

This flange is precast into the trough at the time it is formed and may be made of any suitable plastic or metal. To the underside of leg 18B all around the trough is suitably secured an insulated or resilient pad 20. This pad is intended to compensate for any unevenness in the surface of the supporting platform 11 so that the trough may be firmly mounted on platform 11 in a manner well known in the art.

Leg 15A is fastened to the vertical side wall 11A of platform 11 at points periodically positioned around the platform to securely hold the trough to the platform. To accomplish this, either suitable holes 21 are molded in leg 15A or are cut into leg 15A when the trough is mounted on the platform. Bolts 22 are then used to secure the trough to the platform in any suitable manner such as by the use of expandable plastic or lead plugs or any other suitable well known means.

When the trough is used for watering purposes, it is fitted with plumbing fixtures to provide controlled water flow and drainage for the trough.

FIG. 3 discloses the well known float valve 24 having an inlet pipe 25 entering into the bottom thereof and communicating with the inside of the trough and more particularly watering cavity 12. The pipe is shown as extending along at least a part of the length of the trough and is provided with a control valve 26 within the confines of the trough underneath the watering cavity 12 which is accessible through an opening 27 in the sides of the trough. A door or plate 28 is used to close the opening, which is arranged flush with the outside surface of the trough so that it will present with the outer surface of the trough a smooth, continuous surface. Pipe 25 is closed or partially closed as hereinafter explained at its upper end by valve 24. Valve 24 controls the flow of water from pipe 25 into trough 10.

As shown in FIG. 4, inlet pipe 25 is positioned in a coupling 29 mounted in the bottom of cavity 12, usually at one end of the trough. Valve 24 is actuated as a function of the fluid level in the tank by a lever 30 coupled to a float 31 located within the cavity of the trough in a well known manner.

Valve 24 may be of any suitable type used for toilets and accordingly will not be shown or described herein since it is not the point of novelty of this invention. Lever 30 is attached to valve 24 to open and close it depending on the position of float 31.

Pipe 32 interconnecting pipe 25 with valve 24 at coupling 29 may be provided with a suitable opening or part (not shown) which is not controlled by valve 24 so that a limited amount of water will constantly flow into the trough at all times. This method has been used to attempt to keep the water from freezing and to a limited extent has been successful; however, in cold weather the tank would freeze, thereby not only keeping the livestock from water but at times, depending on the material from which it was formed, destroying the watering trough.

An overflow pipe 33 is mounted on the opposite end of the trough from valve 24 which is suitably connected through well known coupling means 34 to a drain pipe 35 extending through platform 11 and into a sump or drainage system or ditch as so desired. This overflow pipe drains off the water continually flowing through the trough due to the controlled but continuous flow from pipe 33.

As shown in FIG. 4, platform 11 may be attached to an apron or slab (not shown) which is poured along the length of the trough and interlocked therewith by extending into a groove 36 in the platform.

In accordance with the invention, the precast or molded trough is at least partially filled with a suitable insulation such as a phenolic thermosetting resin, for example urethane foamable material 37, which may be preheated and placed in measured quantities in the pockets 13 when the trough, shown in FIGS. 1 and 2, is inverted. The trough at that time should have its pipe 25 installed therein so that it can be covered by the thermosetting plastic as it expands during the curing period of the plastic. This form of injection molding of the insulating material along the underside of the trough is only one way of insulating the trough. This method of insulating the underside of the watering cavity forms a continuous layer of closed cell plastic material which substantially eliminates condensation along the bottom of the cavity as well as within any space that remains between the underside of the watering cavity and the platform or supporting ground. This insulation also eliminates or greatly reduces the spaced sought by varmints.

This invention is particularly directed to the insulation of the bottom or underside of the molded surface of cavity 12 and the filling and substantial elimination of the air spaces and pockets 13 under the trough so that the natural temperature of the water may be maintained longer than heretofore possible and kept from freezing.

As shown in FIGS. 1 and 4, the valving means is enclosed by a suitable cover 37' to keep the animals from disturbing this mechanism.

Thus, a new and improved livestock feeding and watering trough is provided which is precast or molded from plastic or fiberglass and insulated in a new manner to provide an improvement over any trough found in the market place.

Although but one embodiment of the present invention has been illustrated and described, it will be apparent to those skilled in the art that various changes and modifications may be made therein without departing from the spirit of the invention or from the scope of the appended claims.

What is claimed is:

1. A trough for livestock comprising:
   a molded plastic body member, the walls of which define an elongated closed-ended concave cavity extending along its length,
   said walls of said cavity at the periphery of the opening outlining said cavity being turned back on themselves to define legs for supporting the trough,
   said legs and the walls of said cavity forming between them a pocket extending around the cavity,
   insulating means substantially filling said pocket for aiding in retaining the temperature of the substance placed in said trough, and
   a flange mounted adjacent the end of said legs extending laterally and inwardly of said trough for supporting said trough on the top of a platform.

2. The trough set forth in claim 1 wherein: said trough comprises a continuous surface formed of fiberglass.

3. The trough set forth in claim 2 wherein: said insulating means comprises a thermosetting plastic.

4. The trough set forth in claim 2 wherein: said insulating means comprises a urethane material.

5. The trough set forth in claim 2 wherein:
   the ends of said legs are bifurcated, and
   said flange is mounted between the portions of said bifurcated ends of said legs.

6. The trough set forth in claim 5 wherein: said flange is molded to the ends of said legs.

7. The trough set forth in claim 1 in further combination with:
   a water inlet pipe extending along at least a part of the length thereof between said legs below the walls forming the cavity,
   coupling means mounted to extend through the walls of said cavity, and
   a float valve connected to said coupling means for controlling the flow of water into said trough.

8. The trough set forth in claim 7 in further combination with:
an overflow pipe mounted within said cavity and arranged to extend through the bottom thereof for connection to a drainage system.

9. A trough for livestock comprising:
a molded body member, the walls of which define an elongated closed-ended concave cavity extending along its length,
said walls of said cavity at the periphery of the opening outlining said cavity being turned back on themselves to define leg means for supporting the trough,
said leg means and the walls of said cavity forming between them a pocket extending around the cavity, and
a flange mounted adjacent the end of said leg means and extending laterally and inwardly of said trough for supporting said trough on the top of a platform,
the end of said leg means being arranged to fit around the periphery of a part of the platform.

10. The trough set forth in claim 9 wherein:
the end of said leg means comprises a closed loop which tightly fits the periphery of the top of the platform.

11. The trough set forth in claim 9 wherein:
said flange is cemented to the end of said leg means.

12. The trough set forth in claim 10 in further combination with:
fastening means extending through said legs means between their ends and said flange for fastening said leg means to the platform.

13. The trough set forth in claim 10 in further combination with:
insulating means substantially filling said pocket for aiding in retaining the temperature of the substance placed in said trough.

14. A trough for livestock comprising:
a molded body member, the walls of which define an elongated closed-ended concave cavity extending along its length,
said walls of said cavity at the periphery of the opening outlining said cavity being turned back on themselves to define leg means for supporting the trough,
said leg means and the walls of said cavity forming between them a pocket extending around the cavity,
a concrete platform for supporting said trough,
said platform having a flat top smaller in area than its base and positioned inwardly of the periphery of its base,
the periphery of said top being of substantially the same shape as the end of said leg means whereby the end of said leg means fits tightly around the periphery of said top, and
means for fastening said leg means to the periphery of said top of said platform.

15. The trough set forth in claim 14 in further combination with:
a flange mounted adjacent the end of said leg means and extending laterally and inwardly of said trough for supporting said trough on the top of said platform.

16. The trough set forth in claim 15 in further combination with:
insulating means substantially filling said pocket for aiding in retaining the temperature of the substance placed in said trough.

* * * * *